United States Patent Office 2,829,135
Patented Apr. 1, 1958

2,829,135

EPOXIDIZED POLYBUTADIENE RESIN

Frank P. Greenspan, Buffalo, and Rupert E. Light, Jr., Kenmore, N. Y., assignors to Food Machinery and Chemical Corporation, San Jose, Calif.

No Drawing. Application June 27, 1955
Serial No. 518,417

9 Claims. (Cl. 260—94.7)

This invention pertains to a process of making synthetic resins and more particularly to a process of making synthetic resins useful for castings and coatings using polybutadiene as the raw material.

Because of its ready availability and its physical properties, polybutadiene is a potentially useful raw material for the production of thermosetting synthetic resins. Although it is possible to use polybutadiene directly for making coatings, these coatings are not entirely satisfactory, usually showing lack of adhesion and lack of toughness. Particularly difficult is the production of useful castings from polybutadiene.

It has now been found, in accordance with the present invention, that treatment of polybutadiene with specific oxidizing agents followed by treating the oxidation product with acidic reagents, permits the production of resins which will give excellent castings and coatings which are tough, flexible and well adherent.

The process of this invention comprises a series of steps which will be more fully discussed later on. In principle, polybutadiene is treated in this process first with an epoxidizing reagent such as an organic peracid. The resulting oxidized product is then treated with a dicarboxylic acid or the anhydride of such an acid. This last treatment is carried out under conditions which are directly suitable for the production of castings or coatings. If it be desired to produce a casting, the epoxidation product resulting from treating polybutadiene with an organic peracid is mixed with a suitable dicarboxylic acid or anhydride therof and the mixture then poured into a mold. Upon heating, the mixture will then set to a hard, tough and usually light-colored cast resin. If it be desired to form a coating, the oxidation product obtained by treating polybutadiene with an organic peracid is mixed in solvent solution with a suitable dicarboxylic acid or anhydride thereof and this solvent mixture then applied to the surface to be coated and heated. Upon evaporation of the solvent, a tough, flexible and strongly adherent resin coating is then obtained. The resins of the present invention are of the thermosetting type.

Polybutadiene generally can be used as the raw material in the process of this invention. Production of useful oxidized polybutadienes in the sense of this invention requires a starting material of a certain minimum chain length, i. e., degree of polymerization. No theoretical upper limit exists for the chain length of the unsaturated starting material to be oxidized in accordance with this invention. However, there are certain practical considerations which impose a limit on the degree of polymerization of the starting material. Because the oxidation reaction has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the oxidized product. A highly polymerized starting material will produce an oxidized product of somewhat different properties than would be obtained by the use of a starting material of a lower degree of polymerization.

The physical state of polybutadiene is determined by degree of polymerization and molecular weight and is conventionally indicated by viscosity data. The polybutadiene employed in the following examples is thus characterized. Although in those examples, polybutadiene of a viscosity of about 1500 cps. at 100° F. is illustrated, it is to be understood that any liquid or properly soluble polybutadiene of higher or lower molecular weight and viscosity may be used.

The oxidation of the polybutadiene is carried out in accordance with this invention by treating it with an organic peracid. Although organic peracids can be used generally, we prefer to employ the lower aliphatic peracids such as peracetic acid or performic acid. The oxidation reaction may be carried out using a preformed peracid or the peracid may be formed from its constituents during the oxidation reaction and in the reaction medium.

When oxidizing the polybutadiene with the organic peracid, stoichiometric amounts of the peracid may be used or amounts below that theoretically required completely to oxidize the double bonds present in the polybutadiene. In the following examples, polybutadiene treated with the stoichiometric amount of peracid will be designated as "100% oxidized." Polybutadienes oxidized with reduced amounts of peracid will be designated by a percent figure to indicate what might be termed the degree of oxidation in terms of the fraction of the theoretical amount of peracid used. The reactivity and resin-forming properties of the oxidized polybutadiene will obviously vary with its degree of oxidation. Generally speaking, a 100% oxidized polybutadiene will be more reactive and will more readily form a casting or coating resin than polybutadiene oxidized to a lesser extent. At the same time the properties of the finished casting or coating will also be influenced to an extent by the degree of the oxidation of the polybutadiene.

As indicated above, the oxidized polybutadiene is subsequently treated with a saturated or unsaturated dicarboxylic acid or anhydride. Examples of acids which may be used in the process of this invention are: adipic, fumaric, maleic, malic, oxalic, sebacic, tartaric and others. Examples of anhydrides which may be used are: maleic, succinic, phthalic, tetrahydrophthalic and others. Certain limitations on the choice of acid or anhydride are, however, imposed by the practical process requirements. If casting resins are to be produced, the oxidized polybutadiene has to be mixed with the acid or anhydride before casting and heating. To permit proper mixing, the two main reactants—the oxidized polybutadiene and the acid or anhydride—should be liquid. Therefore, in the case of casting resins, the acid or anhydride should be a liquid at ordinary temperature or must have a relatively low melting point to permit mixing at room temperature or somewhat elevated temperature. In the case of coating resins, a solvent is invariably used from which the coating is then obtained by evaporation. In this case, a solvent is chosen in which the acid or anhydride used is soluble and from which the coating is made.

The amount of dicarboxylic acid or anhydride to be used for treating oxidized polybutadiene depends on the degree of oxidation of the polybutadiene and the particular acid or anhydride used. Generally speaking, one equivalent weight of oxidized polybutadiene, that is, the weight of polybutadiene containing 16 grams of oxirane oxygen, is treated with one equivalent weight of the dicarboxylic acid; that is, an amount of acid by weight corresponding to one-half of the molecular weight of the dibasic acid. In the case of anhydrides, this amount is calculated as it would be for the corresponding acid. The amount of acid or anhydride calculated in this way represents the theoretical amount for complete reaction with one equivalent weight of the oxidized polybutadiene. For example, if a sample of oxidized polybutadiene is found by analysis to contain 6.6 grams of oxirane oxygen per 100 grams of product, the equivalent weight of the product will then be $$\frac{100 \times 16}{6.6} \text{ or } 242 \text{ grams}$$

If this product is to be treated with, e. g. adipic acid, whose equivalent weight is one-half of its molecular weight or 73 grams, then the theoretical amount of adipic acid to be used with this particular oxidized polybutadiene would be $$\frac{73 \text{ g.}}{242} \text{ or } 0.301 \text{ gram}$$

of acid per gram of this particular oxidized polybutadiene.

In accordance with this invention, from 10 to 100% of the calculated theoretical amount of acid or anhydride may be used in the production of the new casting or coating resins of this invention. Reduced amounts will be used, particularly if it is desired to have only a minimum amount of acidic material present in the finished product.

The following examples will illustrate in some detail the principle of this invention. In Example 1, in particular, the process will be described in full detail.

*Example 1*

100 g. of polybutadiene, viscosity 1500 cps. at 100° F., were dissolved in 100 ml. of benzene. To this solution was added slowly, over a period of about one hour, 275 g. of 40% peracetic acid solution stabilized with dipicolinic acid and 10.6 g. of sodium acetate to adjust the acidity of the reaction mixture. This amount of peracetic acid corresponds to the stoichiometric amount required to fully oxidize the polybutadiene. The temperature was maintained at about 20 to 25° C. over a total reaction time of 3 hours, 45 minutes. The product was then washed three times with a saturated solution of sodium chloride, twice with a saturated solution of sodium chloride containing potassium hydroxide to neutralize residual acid in the mixture and finally washed three times with distilled water. The mixture was then filtered through filter paper and excess solvent was removed at room temperature at a pressure of about one to two millimeters of mercury. Finally, the essentially solvent-free product layer was separated from the water layer and dried in a vacuum desiccator. The product was analyzed and found to contain 6.6% oxirane oxygen which was determined by an analytical procedure corresponding essentially to that of Swern et al., described in Analytical Chemistry 19, 404 (1947).

The oxidized polybutadiene was then again dissolved in an amount of benzene to give a 10% solution. To this solution was then added an amount of adipic acid corresponding to 0.301 gram per gram of oxidized polybutadine in solution. This mixture was then evenly spread on a glass plate and the coated glass plate then baked for 4 hours at 110° C. The resin was thermosetting as the coating obtained after baking was very hard and tough. The resin film showed very good adhesion to the glass. It was of a very light-brown color.

*Example 2*

Another sample of the same polybutadiene as used in Example 1 was oxidized with peracetic acid as described in that example. A 10% benzene solution was prepared from the oxidized polybutadiene and divided into small batches to each of which was added the proper amount of dicarboxylic acid or anhydride followed by coating a glass plate and baking the coated plate for 4 hours at 110° C.

The various procedures are presented in the following Table No. 1:

| Acid or anhydride | Gram per gram of resin | Properties of the set films |
|---|---|---|
| Fumaric acid | 0.239 | Very hard, tough, excellent adhesion. |
| Maleic acid | 0.239 | Hard, tough, very good adhesion. |
| Malic acid | 0.276 | Very hard, tough, very good adhesion, slightly yellow. |
| Oxalic acid | 0.259 | Very hard, tough, very good adhesion. |
| Sebacic acid | 0.416 | Hard, slightly brittle, very good adhesion, slightly yellow. |
| Tartaric acid | 0.309 | Very hard, tough, very good adhesion. |
| Maleic anhydride | 0.202 | Very hard, tough, good adhesion. |
| Succinic anhydride | 0.206 | Very hard, tough, very good adhesion. |
| Phthalic anhydride | 0.306 | Very hard, tough, very good adhesion, very light brown. |
| Tetrahydrophthalic anhydride | 0.313 | Extremely hard, tough, very good adhesion, light straw yellow. |

*Example 3*

This example shows the process of this invention as applied to making a casting resin.

500 g. of polybutadiene, viscosity 1500 cps. at 100° F., were dissolved in 500 ml. of toluene. To this solution was added slowly, over a period of about one hour, 1455 g. of 40% peracetic acid solution and 64 g. of sodium acetate to adjust the acidity of the reaction mixture. This amount of peracetic acid corresponds to the stoichiometric amount required fully to oxidize the polybutadiene. The temperature was maintained at about 20 to 30° C. over a total reaction time of 3 hours, 20 minutes. The product was cooled and then washed three times with a saturated solution of sodium chloride, twice with a saturated solution of sodium chloride containing potassium hydroxide to neutralize residual acid in the mixture and finally washed three times with distilled water. The mixture was then filtered through filter paper and excess solvent was removed at room temperature at a pressure of about one to two millimeters of mercury. Finally, the essentially solvent free product layer was separated from the water layer and dried in a vacuum desiccator. The product was analyzed and found to contain 6.6% oxirane oxygen, which was determined by an analytical procedure corresponding essentially to that of Swern et al., described in Analytical Chemistry 19, 404 (1947).

25 g. of this oxidized polybutadiene were then taken and warmed to about 120° C. to increase its fluidity and to facilitate mixing in of 12.5 g. of melted tetrahydrophthalic anhydride (melting point 120° C.). The molten mixture was then poured into a mold, heated for about 30 minutes at 120° C. and then baked for 2 hours at 150° C. After cooling and removal from the mold, a clear, very hard and tough casting was obtained.

*Example 4*

This example illustrates the making of a casting resin from polybutadiene oxidized with 50% of the stoichiometric amount of peracetic acid.

500 g. of polybutadiene, 1500 cps. viscosity of 100° F., was dissolved in 500 g. of toluene. To this mixture was added one-half of the stoichiometric amount, that is, 727.5 g. of 40% peracetic acid stabilized with dipicolinic acid and 32 g. of sodium acetate to adjust the acidity of the mixture.

This addition was made over a period of 25 minutes at a temperature of about 23 to 26° C. Thereafter, the reaction mixture was kept for one hour at about 25° C. and for another hour at about 35° C. The product was then cooled to room temperature and washed as described in Example 1. It was then freed of solvent by heating under reduced pressure. It was then analyzed and found to contain 5.6% oxirane oxygen and to be free of volatile solvent. 30 g. of this oxidized polybutadiene were then warmed to about 120° C. and mixed with 14.4 g. of melted tetrahydrophthalic anhydride. The mixture was poured into a mold, heated for 15 minutes at 120° C., heated up to 150° C. over a period of 15 minutes and finally held at this temperature for about 3½ hours. After cooling and removal from the mold, a clear, hard resin was obtained.

Example 5

This example illustrates the making of a casting resin from polybutadiene partially oxidized with peracetic acid formed in the reaction medium from acetic acid and hydrogen peroxide.

1500 g. of polybutadiene, 1500 cps. viscosity at 100° F. was dissolved in 1500 g. of toluene. To this mixture was added 300 g. of glacial acetic acid, 500 g. of a nuclear sulfonic type cation exchange resin (Dowex 50) and 786 g. of hydrogen peroxide 50%. The amount of hydrogen peroxide used corresponds to approximately 50% of the stoichiometric amount required to fully oxidize polybutadiene. This mixture was then maintained with constant stirring at a temperature of about 65° C. for about 3 hours. The partially oxidized polybutadiene was then recovered in the manner described in Example 1 and found by analysis to contain 6.19% oxirane oxygen. 100 g. of this product was then taken and warmed to about 70° C. to increase its fluidity and to facilitate mixing in of 20 g. of maleic anhydride. This mixture was then poured into a mold and baked for three hours at about 150° C. After cooling and removal from the mold, a clear, hard and tough casting was obtained.

Example 6

This example illustrates the fact that relatively low oxidation of the polybutadiene is sufficient to produce useful resins in accordance with the process of this invention. A sample of polybutadiene, 1500 cps. viscosity 100° F. was oxidized as described in Example 5, but using an amount of hydrogen peroxide corresponding to only 12.5% of the stoichiometric amount required to fully oxidize the polybutadiene. The partially oxidized polybutadiene was recovered and found to contain 1.81% oxirane oxygen.

The oxidized polybutadiene was then warmed to about 120° C. to facilitate mixing in melted maleic acid anhydride in an amount corresponding to 9 g. per 100 g. of oxidized polybutadiene. The mixture was poured into a mold and heated for 4 hours at 140° C. After cooling and removal from the mold, a tough, putty-like casting was obtained.

Example 7

Castings may even be produced from polybutadiene oxidized to only 5% of the theoretical value. The procedure illustrated in Example 6 was duplicated but the amount of hydrogen peroxide used corresponded to only 5% of the stoichiometric amount required to fully oxidize the polybutadiene. The partially oxidized polybutadiene after removal was found to contain 0.77% oxirane oxygen.

It was then treated in the manner described in Example 6 using a quantity of 4.7 g. of moleic anhydride per 100 g. of oxidized polybutadiene and the resulting mixture poured into a mold. After heating for 4 hours at 150° C. the product was removed from the mold in form of a putty-like casting.

Example 8

This example describes preparation of a coating resin from a fully oxidized polyisoprene (polymer of 2-methyl-1,3 butadiene). A batch of 2-polyisoprene was oxidized as described in Example 1 with the stoichiometric amount of peracetic acid required to fully oxidize the polybutadiene and the oxidized product was recovered as described in Example 1. Analysis showed that the product contained 5.61% oxirane oxygen. The oxidized polybutadiene was then dissolved in chloroform to give a 10% solution. To this solution was then added an amount of adipic acid corresponding to 0.064 g. per gram of oxidized polybutadiene in solution. This mixture was then evenly spread on a glass plate and the coated plate baked for 4 hours at about 105 to 110° C. The resin coating obtained after baking was very hard and tough and showed excellent adhesion to the glass plate.

Other batches of the 10% chloroform solution of this oxidized polybutadiene were reacted with phthalic acid (0.29 g. per gram of oxidized polybutadiene), succinic acid (0.206 g. per gram of oxidized polybutadiene), phthalic anhydride (0.259 g. per gram of oxidized polybutadiene) and succinic anhydride (0.175 g. per gram of oxidized polybutadiene). Glass plates were coated with these preparations and baked for 4 hours at 105 to 110° C. In every case, the resin coating obtained was very hard, tough and showed excellent adhesion to the glass.

Example 9

50 g. of an emulsion polymerized polybutadiene rubber (viscosity 1600 cps. in 75% toluene solution) were dissolved in 760 g. of benzene. To this solution was added, over a period of 15 minutes, 173 g. of 40% peracetic acid solution stabilized with dipicolinic acid and 7.6 g. of sodium acetate to adjust the acidity of the reaction mixture. This amount of peracetic acid corresponds to a 20% excess over the stoichiometric amount required for complete oxidation. The mixture was then maintained at about 27° C. for 60 minutes and the product recovered as described in Example 1. Analysis showed an oxirane oxygen content of 6.9%.

The oxidized polybutadiene was then again dissolved in benzene to give an 11% solution. To this solution was then added an amount of maleic acid corresponding to 0.187 g. per gram of solids in the benzene solution. This mixture was then evenly spread on a glass plate and the coated plate baked for 2 hours at 150° C. The resin coating obtained after baking was very hard, very tough and showed excellent adhesion to the glass.

Example 10

This example shows the use of performic acid formed in the reaction medium in the making of a cast resin.

1500 g. of polybutadiene, 1500 cps. viscosity 100° F., were dissolved in 1500 g. of toluene and to this was added 220 g. of 90% formic acid and 730 g. of hydrogen peroxide 50%. The hydrogen peroxide was added over a period of 45 minutes while keeping the mixture at about 30° C. Thereafter, the mixture was maintained at 30° C. for about 11 hours and thereafter heated to 65° C. and maintained at this temperature for about 3 hours. The product was recovered in the usual manner and analyzed and found to contain 6.05% oxirane oxygen. 100 g. of this oxidized polybutadiene were then taken and warmed to 70° C. to increase its fluidity and to facilitate mixing in of 18.25 g. of melted maleic anhydride. The molten mixture was then poured into a mold, heated for one hour at 105° C. and for an additional 4 hours at 140° C. After a cooling and removal from the mold, a clear, hard and tough casting was obtained.

In summary therefore, the invention comprises first subjecting a polymer of butadiene to an epoxidizing reaction with an epoxidizing reagent, the amount of such reagent being such that at least 5% of the potentially epoxidizable double bonds are epoxidized and subsequently reacting the so oxidized polybutadiene with a polybasic acid, the amount of the latter being at least 10% of that required for complete reaction so that a thermosetting resin is formed as an end product.

What is claimed is:

1. A method for the production of thermoset resins which comprises epoxidizing a polybutadiene containing as polymer forming units only butadiene, with an amount of a liquid lower aliphatic peracid corresponding to at least 5% of the amount required to epoxidize all double bonds present in said polybutadiene and then contacting the thus epoxidized polybutadiene with a compound selected from the group consisting of dibasic carboxylic acids and their anhydrides in an amount corresponding to at least 10% of the amount required for complete reaction with the epoxidized polybutadiene, and heating the resulting mixture until a thermoset resin has been formed.

2. The method of claim 1 in which the aliphatic peracid is peracetic acid.

3. The method of claim 1 in which the aliphatic peracid is performic acid.

4. As a new composition of matter, a thermoset resin produced by the method of claim 1.

5. The step in the production of thermoset resins from an epoxidized polybutadiene formed by reaction of a polybutadiene with a liquid lower aliphatic peracid, said polybutadiene containing as polymer forming units only butadienes, which step comprises contacting said epoxidized polybutadiene with a compound selected from the group consisting of dibasic carboxylic acids and their anhydrides in an amount corresponding to at least 10% of the amount required for complete reaction with the epoxidized polybutadiene, and heating the resulting mixture until a thermoset resin has been formed.

6. The step in the production of thermoset resins from an epoxidized polybutadiene formed by reaction of a polybutadiene with peracetic acid, said polybutadiene containing as polymer forming units only butadienes, which step comprises contacting said epoxidized polybutadiene with a compound selected from the group consisting of dibasic carboxylic acids and their anhydrides in an amount corresponding to at least 10% of the amount required for complete reaction with the epoxidized polybutadiene, and heating the resulting mixture until a thermoset resin has been formed.

7. The step in the production of thermoset resins from an epoxidized polybutadiene formed by reaction of a polybutadiene with performic acid, said polybutadiene containing as polymer forming units only butadienes, which step comprises contacting said epoxidized polybutadiene with a compound selected from the group consisting of dibasic carboxylic acids and their anhydrides in an amount corresponding to at least 10% of the amount required for complete reaction with the epoxidized polybutadiene, and heating the resulting mixture until a thermoset resin has been formed.

8. A method for the production of thermoset resins which comprises epoxidizing a polybutadiene containing as polymer forming units only butadienes, with an amount of a liquid lower aliphatic peracid corresponding to at least 5% of the amount required to epoxidize all double bonds present in said polybutadiene and then contacting the thus epoxidized polybutadiene with a compound selected from the group consisting of polybasic carboxylic acids and their anhydrides in an amount corresponding to at least 10% of the amount required for complete reaction with the epoxidized polybutadiene, and heating the resultant mixture until a thermoset resin has been formed.

9. As a new composition of matter, a thermoset resin produced by the method of claim 8.

References Cited in the file of this patent

UNITED STATES PATENTS

| | | |
|---|---|---|
| 2,543,419 | Niederhauser | Feb. 27, 1951 |
| 2,660,563 | Banes et al. | Nov. 24, 1953 |

OTHER REFERENCES

Mageli et al.: Can., J. Chem., vol. 31 (1953) pp. 23–29.
Schmitz et al.: J. Amer. Oil Chem. Soc., vol. 31 (1954) pp. 363–65.